(12) United States Patent
Tsuzaki et al.

(10) Patent No.: US 6,819,829 B2
(45) Date of Patent: Nov. 16, 2004

(54) OPTICAL COMMUNICATION SYSTEM

(75) Inventors: Tetsufumi Tsuzaki, Yokohama (JP); Masayuki Nishimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 346 days.

(21) Appl. No.: 10/058,326

(22) Filed: Jan. 30, 2002

(65) Prior Publication Data

US 2002/0102051 A1 Aug. 1, 2002

(30) Foreign Application Priority Data

Jan. 31, 2001 (JP) .................................... P2001-024267

(51) Int. Cl.[7] .............................................. G02B 6/28
(52) U.S. Cl. ........................................ 385/24; 385/18
(58) Field of Search ............................. 385/24, 9, 15, 385/16, 17, 18, 31, 50

(56) References Cited

U.S. PATENT DOCUMENTS

| | | | |
|---|---|---|---|
| 4,699,452 A | 10/1987 | Mollenauer et al. | |
| 5,883,736 A | 3/1999 | Oshima et al. | |
| 6,320,884 B1 | 11/2001 | Kerfoot, III et al. | |
| 6,377,375 B1 | 4/2002 | Taga et al. | |
| 6,377,389 B1 | 4/2002 | Grubb et al. | |
| 6,417,959 B1 | 7/2002 | Bolshtyansky et al. | |
| 6,417,963 B1 * | 7/2002 | Ohishi et al. ............ | 359/341.1 |
| 6,433,921 B1 | 8/2002 | Wu et al. | |
| 6,441,952 B1 | 8/2002 | Duan et al. | |
| 6,574,037 B2 * | 6/2003 | Islam et al. ............... | 359/334 |
| 6,603,896 B1 * | 8/2003 | MacCormack et al. ....... | 385/24 |
| 2001/0019448 A1 | 9/2001 | Yokoyama | |
| 2002/0024723 A1 | 2/2002 | Sekiya et al. | |
| 2002/0044324 A1 | 4/2002 | Hoshida et al. | |
| 2002/0093724 A1 | 7/2002 | Krummrich et al. | |
| 2002/0114061 A1 | 8/2002 | Naito et al. | |

FOREIGN PATENT DOCUMENTS

| EP | 1 170 888 A1 | 1/2002 | |
|---|---|---|---|
| WO | WO 00/49721 | 8/2000 | |
| WO | WO0049721 A3 * | 8/2000 | ............. H01S/3/06 |

OTHER PUBLICATIONS

Emori, et al., "*100nm Bandwidth Flat Gain Raman Amplifiers Pumped And Gained Equalized By 12–Wavelength–Channel WDM High Power Laser Diodes*" Opto–Technology Laboratory, Furukawa Electric Co., Ltd., pp. PD19–1–PD19–3.

Koch, et al., "*Broadband Gain Flattened Raman Amplifier to Extend Operation In The Third Telecommunication Window*" Femtosecond Optics Group, Imperial College, pp. FF3–1/103–FF3–3/105.

* cited by examiner

*Primary Examiner*—Frank G. Font
*Assistant Examiner*—Kevin C Kianni
(74) *Attorney, Agent, or Firm*—McDermott Will & Emery LLP (57) ABSTRACT

The present invention relates to an optical communication system having a flat gain spectrum and an excellent pumping efficiency in a signal wavelength band, and comprising a structure which is realizable/operable at a low cost. This optical communication system comprises an optical transmission line including a plurality of Raman amplification optical fibers, and pumping light suppliers for supplying pumping light to the Raman amplification optical fibers. In particular, two Raman amplification optical fibers selected from the plurality of Raman amplification optical fibers included in the optical transmission line differ from each other in at least one of the wavelength at which the gain of Raman amplification becomes the highest, and the number of channels at which the gain of Raman amplification is maximum. Such a structure flattens the gain of Raman amplification viewed from the whole optical transmission line from a transmitter to a receiver within the signal wavelength band even when the gain spectrum of Raman amplification in each of the Raman amplification optical fibers included in the optical transmission line is not flat within the signal wavelength band.

2 Claims, 10 Drawing Sheets

OPTICAL COMMUNICATION SYSTEM

BACKGROUND OF THE INVENTION

1. Field of the Invention

The present invention relates to an optical communication system utilizing signal light including respective wavelength components assigned to a plurality of channels; and, in particular, to an optical communication system in which Raman amplification compensates for the transmission loss occurring when the signal light propagates through an optical transmission line.

2. Related Background Art

In an optical communication system utilizing signal light (wavelength division multiplexing light) including respective wavelength components assigned to a plurality of channels within a signal wavelength band, the signal light transmitted from a transmitter incurs transmission loss while propagating through the optical transmission line, so that the signal light decreases its power when reaching a receiver. If the signal light having reached the receiver has a power not higher than a predetermined value, reception errors may occur, whereby normal optical communications may not be carried out. Therefore, an optical amplifier is disposed between the transmitter and receiver, and the signal light is amplified by the optical amplifier, whereby the transmission loss occurring in the signal light propagating through the optical transmission line is compensated for.

Known as such an optical amplifier are optical fiber amplifiers doped with rare-earth elements (e.g., Er-doped optical fiber amplifier) and Raman amplifiers utilizing Raman amplification phenomena in Raman amplification optical fibers. As compared with the optical fibers doped with rare-earth elements, the Raman amplifiers have such characteristics that they can adjust a gain-yielding wavelength band by appropriately setting the wavelength of Raman amplification pumping light, and the like.

In wavelength division multiplexing (WDM) optical communication systems for carrying out optical communications by utilizing signal light in which a plurality of wavelength components within a predetermined signal wavelength band are multiplexed, it is important that optical amplifiers in this signal wavelength band have a flat gain spectrum; otherwise, even when a signal of a signal channel within the signal wavelength band is correctly received by the receiver, signals of other signal channels having a lower gain may yield reception errors. Hence, studies have been conducted concerning techniques for flattening the gain spectrum of Raman amplifiers.

For example, in the gain flattening technique for Raman amplifiers disclosed in literature 1, i.e., Y. Emori, et al., "100 nm bandwidth flat gain Raman amplifiers pumped and gain-equalized by 12-wavelength-channel WDM high power laser diodes, " OFC'99, PD19 (1999), respective output light components from N (N≧2) pumping light sources are multiplexed, and thus multiplexed light is supplied as Raman amplification pumping light to a Raman amplification optical fiber. Also, the output center wavelength and output power of each of the N pumping light sources are appropriately set, so as to flatten the gain spectrum of Raman amplifiers. In literature 1, the number of pumping light sources, N, is 12.

In the gain flattening technique for a Raman amplifier disclosed in literature 2, i.e., F. Koch, et al., "Broadband gain flattened Raman amplifier to extend operation in the third telecommunication window, " OFC'2000, ThD, FF3 (2000), the gain spectrum of Raman amplifier is flattened by a gain equalizer having a loss spectrum with a shape substantially identical to that of the gain spectrum in the Raman amplification optical fiber.

SUMMARY OF THE INVENTION

The inventors studied conventional optical communication systems and, as a result, have found problems as follows. Namely, there is a case where M (M≧2) Raman amplifiers are necessary between a transmitter and a receiver in an optical communication system for carrying out long-distance optical communications. If the above-mentioned gain flattening technique in conventional Raman amplifiers (literature 1) is employed in this case, the total number of pumping light sources necessary in the whole optical communication system will be M×N, thereby raising the manufacturing cost.

In Raman amplifiers employing the gain flattening technique disclosed in literature 2, the pumping efficiency is low due to its structure in which, while the signal light is Raman-amplified by Raman amplification optical fibers, thus amplified signal light is attenuated by gain equalizers and the like.

For overcoming the problems mentioned above, it is an object of the present invention to provide an optical communication system having a flat Raman gain spectrum and excellent pumping efficiency in a signal wavelength band, and comprising a structure which is realizable/operable at a low cost.

The optical communication system according to the present invention is an optical communication system which transmits signal light (WDM light) including respective wavelength components assigned to a plurality of signal channels within a signal wavelength band from a first point to a second point. This optical communication system comprises an optical transmission line including a plurality of Raman amplification optical fibers, and respective pumping light suppliers provided so as to correspond to the Raman amplification optical fibers.

The optical transmission line transmits signal light from the first point to the second point, whereas each of a plurality of Raman amplification optical fibers constituting at least a part of the optical transmission line Raman-amplifies the signal light when the Raman amplification pumping light is supplied thereto. Each of the pumping light suppliers supplies Raman amplification pumping light to its corresponding Raman amplification optical fiber.

In the optical communication system according to the present invention, in particular, two Raman amplification optical fibers selected from the plurality of Raman amplification optical fibers included in the optical transmission line differ from each other in one of the wavelength at which the gain of Raman amplification becomes the highest and the number of signal channels at which the gain of Raman amplification is maximum. Also, in the optical communication system, the pumping light suppliers provided so as to correspond to the selected two Raman amplification optical fibers may differ from each other in the number of pumping light sources contained therein. Preferably, in the optical communication system, a value obtained by integrating the absolute value of difference between respective gain spectra of Raman amplification in the selected two Raman amplification optical fibers with respect to wavelength is at least 7.5 dB·nm.

In the optical communication system according to the present invention, signal light including a plurality of wavelength components (assigned to respective signal channels) within a signal wavelength band sent out from a first point (transmitter or repeater) propagates through an optical transmission line including a plurality of Raman amplification optical fibers, so as to reach a second point (receiver or repeater). Here, the optical transmission line may include an optical fiber laid in a repeating section, and an optical fiber within a repeater, one of which is a Raman amplification optical fiber. Each of the plurality of Raman amplification optical fibers receives Raman amplification pumping light supplied from its corresponding pumping light supplier, transmits signal light, and Raman-amplifies the signal light. In the optical communication system according to the present invention, in particular, two selected Raman amplification optical fibers are different from each other in one of the wavelength at which the gain of Raman amplification becomes the highest and the number of signal channels at which the gain of Raman amplification is maximum. Preferably, they are further different from each other in the number of pumping light sources included in the respective pumping light suppliers provided so as to correspond thereto. In such a configuration, though the gain spectrum of Raman amplification in each Raman amplification optical fiber does not become flat within the signal wavelength band, at least the gain spectrum of Raman amplification viewed from the whole optical transmission line from the first point to the second point can be flattened within the signal wavelength band. The optical communication system according to the present invention can reduce the total number of pumping light sources necessary in the whole system as compared with the system disclosed in literature 1. Also, this can greatly lower the manufacturing and operating cost of the system. Further, since this optical communication system does not have a structure in which signal light is attenuated by a gain equalizer so as to flatten the gain, a better pumping efficiency is obtained as compared with the system disclosed in literature 2.

DETAILED DESCRIPTION OF THE PREFERRED EMBODIMENTS

Embodiments of the optical communication system according to the present invention will now be explained in detail with reference to FIGS. 1, 2, 3A to 6D, and 7 to 13. In the explanation of the drawings, constituents identical to each other will be referred to with numerals identical to each other without repeating their overlapping descriptions.

Figure 1:
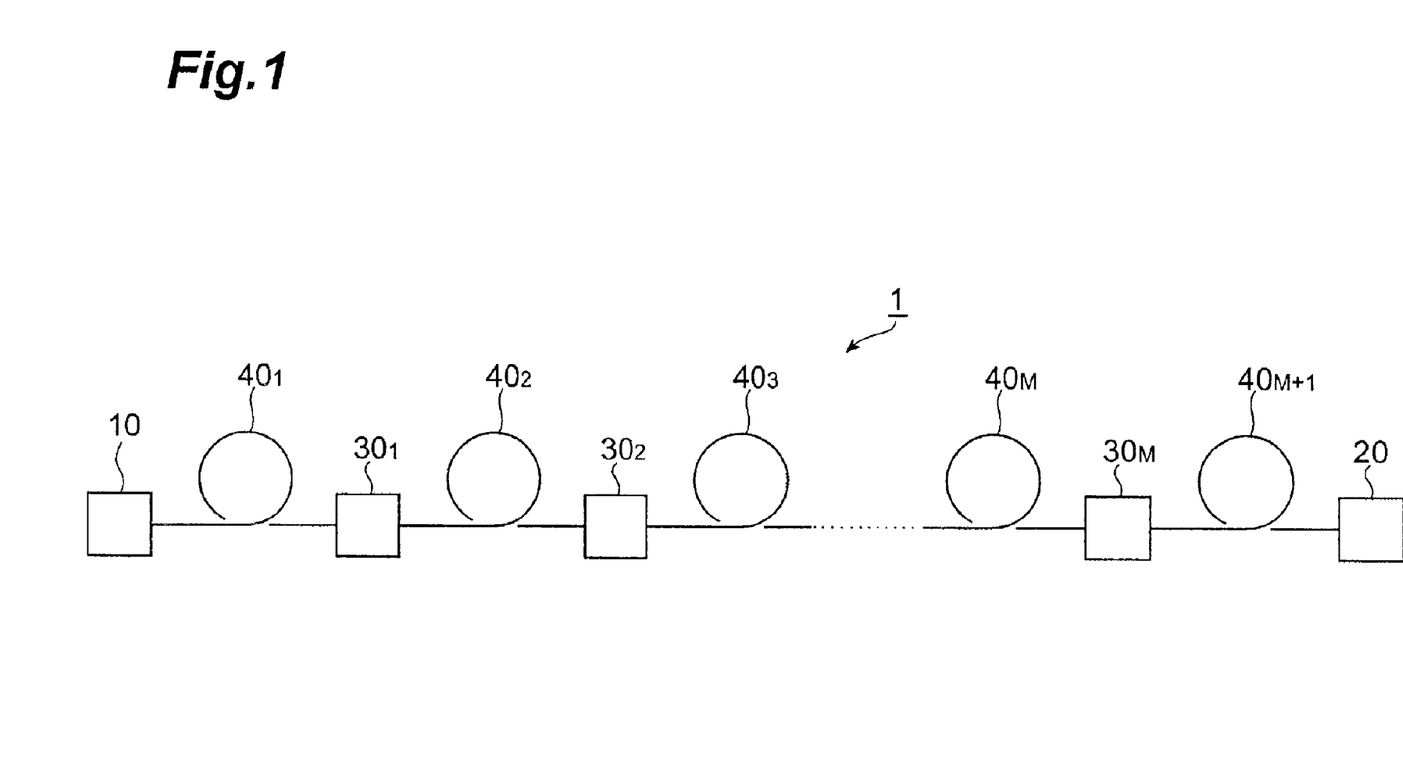
FIG. 1 is a diagram showing a typical schematic configuration of the optical communication system according to the present invention.

FIG. 1 is a diagram showing a typical schematic configuration of the optical communication system according to the present invention, illustrating the structure of each embodiment explained in the following except for the configuration of each repeater. As shown in FIG. 1, the optical communication system 1 according to the present invention comprises an optical transmission line for transmitting signal light (WDM light) including wavelength components assigned to a plurality of signal channels from a transmitter (or repeater) 10 to a receiver (or repeater) 20. Further, the optical communication system 1 comprises M (M≧2) repeaters $30_1$ to $30_M$ successively arranged on the optical transmission line through which the signal light propagates. In this optical communication system 1, an optical fiber $40_1$ is laid in the repeating section between the transmitter 10 and the repeater $30_1$, an optical fiber $40_{m+1}$ is laid in the repeating section between the repeaters $30_m$ and $30_{m+1}$ (1≦m<M), and an optical fiber $40_{M+1}$ is laid in the repeating section between the repeater $30_M$ and the receiver 20.

The optical transmission line for transmitting signal light from the transmitter 10 to the receiver 20 includes not only the optical fibers $40_1$ to $40_{M+1}$ laid in the respective repeating sections, but also respective optical fibers within the repeaters $30_1$ to $30_M$. In the optical communication system 1, the signal light sent out from the transmitter 10 is successively transmitted through the optical fibers $40_1$ to $40_{M+1}$ by way of the repeaters $30_1$ to $30_M$ therebetween, and then reaches the receiver 20.

The optical transmission line in the optical communication system 1 includes a plurality of Raman amplification optical fibers for Raman-amplifying the signal light when Raman amplification pumping light is supplied thereto. For example, the signal wavelength band in which wavelength components included in the signal light exist is a 1.55-$\mu$m band, whereas the wavelength band of Raman amplification pumping light is a 1.45-$\mu$m band. The Raman amplification optical fiber maybe any or both of the optical fiber $40_1$ to $40_{M+1}$ laid in each repeating section and the optical fiber within each of the repeaters $30_1$ to $30_M$.

First Embodiment

Figure 2:
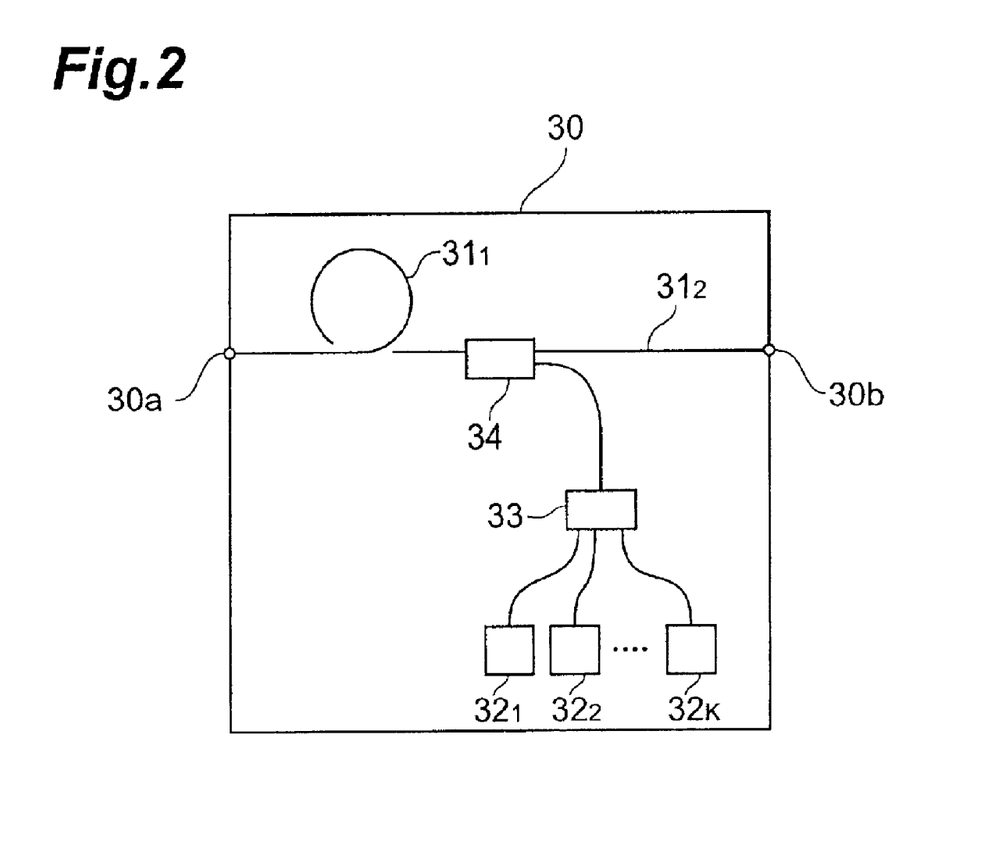
FIG. 2 is a diagram showing the structure of a repeater employed in the optical communication system of FIG. 1 as a first embodiment of the optical communication system according to the present invention.

FIG. 2 is a diagram showing the configuration of repeater 30 as a first embodiment of the optical communication system according to the present invention. The optical communication system according to the first embodiment has a configuration similar to that shown in FIG. 1, whereby the repeater 30 of FIG. 2 is employed as the repeaters $30_1$ to $30_M$ in the optical communication system 1 shown in FIG. 1. The repeater 30 includes optical fibers $31_1$, $31_2$, K (K $\geq$ 1) pumping light sources $32_1$ to $32_K$, an optical multiplexer 33, and an optical coupler 34. The optical fiber $31_1$, optical coupler 34, and optical fiber $31_2$ are successively arranged in this order on the signal light path between an input end 30a and an output end 30b. Here, the optical fiber $31_1$ is a long optical fiber through which signal light and Raman amplification pumping light propagate between the input end 30a and the optical coupler 34, and functions as a Raman amplification optical fiber.

The pumping light sources $32_1$ to $32_K$ are semiconductor laser light sources, for example, and are different from each other in the center wavelength of output light. The optical multiplexer 33 multiplexes respective light components outputted from the pumping light sources $32_1$ to $32_K$, and outputs thus multiplexed light as Raman amplification pumping light to the optical coupler 34. The optical coupler 34 guides the Raman amplification pumping light (multiplexed light) outputted from the optical multiplexer 33 to the optical fiber $31_1$, and outputs to the optical fiber $31_2$ the signal light inputted from the optical fiber $31_1$.

Namely, in the repeater 30, the optical fiber $31_1$ functions as a Raman amplification optical fiber which Raman-amplifies signal light when Raman amplification pumping light is supplied thereto. Also, the pumping light sources $32_1$ to $32_K$, optical multiplexer 33, and optical coupler 34 constitute a pumping light supplier for supplying the Raman amplification pumping light to the optical fiber $31_1$ acting as a Raman amplification optical fiber. The signal light fed to the input end 30a is Raman-amplified while propagating through the optical fiber $31_1$, and is outputted from the output end 30b by way of the optical coupler 34 and optical fiber $31_2$.

Figure 3A:
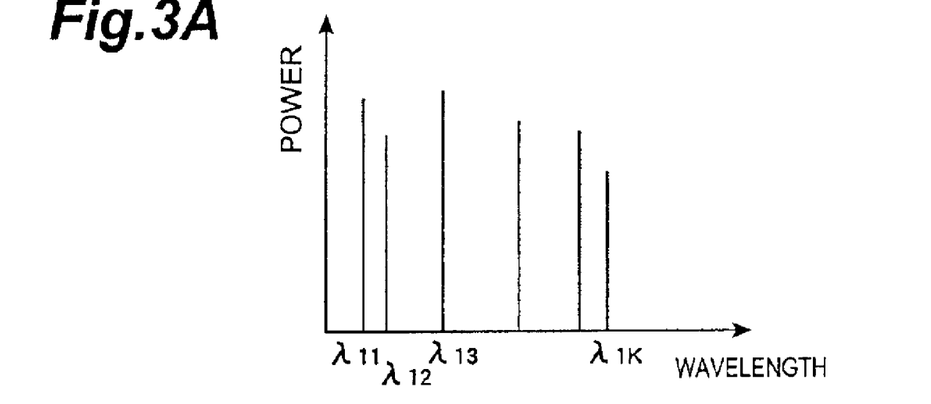
FIGS. 3A to 3C are respective examples of spectra of Raman amplification pumping light in parts of the optical communication system according to the first embodiment.
Figure 3B:
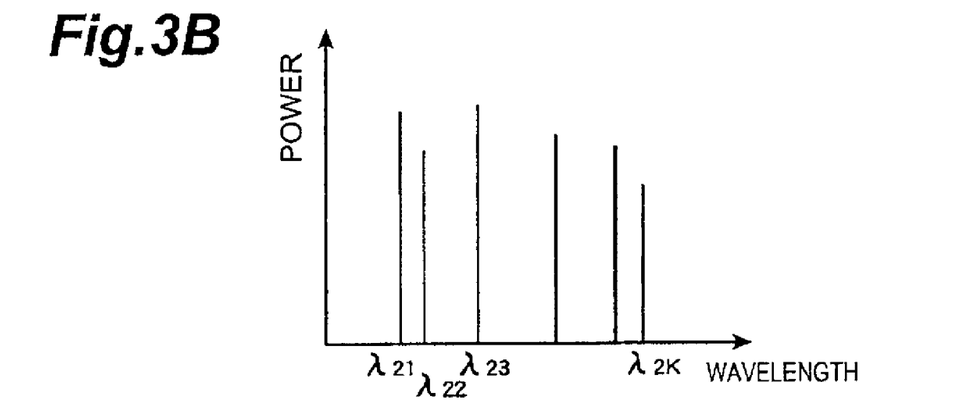
Figure 3C:
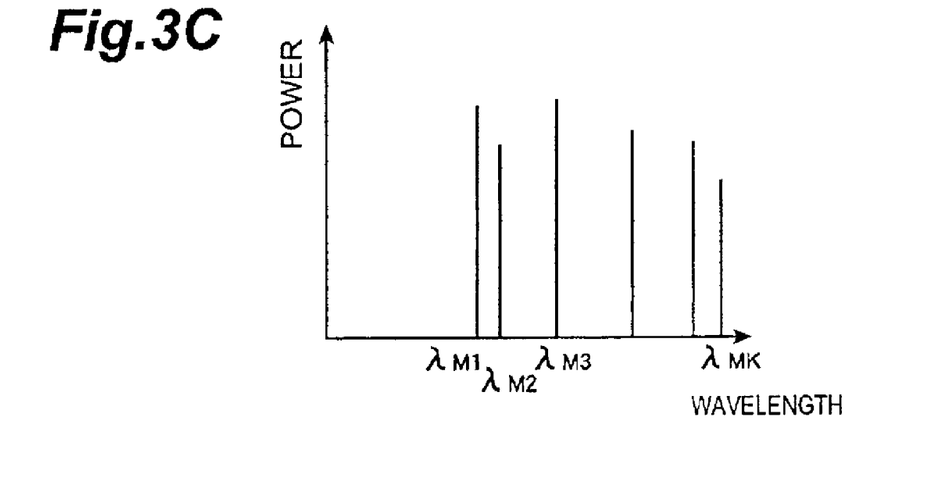

FIGS. 3A to 3C are respective examples of spectra of Raman amplification pumping light in parts of the optical communication system according to the first embodiment. FIGS. 4A to 4D are respective examples of spectra of Raman amplification pumping light in parts of the optical communication system according to the first embodiment. FIGS. 5A to 5C are other respective examples of spectra of Raman amplification pumping light in parts of the optical communication system according to the first embodiment. FIGS. 6A to 6D are respective examples of spectra of Raman amplification pumping light in parts of the optical communication system according to the first embodiment. In each spectrum, the center wavelength of output light from the k-th pumping light source $32_k$ in the repeater $30_m$ in the m-th stage is indicated as $\lambda_{mk}$ ($1 \leq m \leq M$, $1 \leq k \leq K$).

FIGS. 3A and 5A are spectra of Raman amplification pumping light (i.e., power of light having a wavelength of $\lambda_{11}$ to $\lambda_{1k}$) in the repeater $30_1$ of the first stage. FIGS. 3B and 5B are spectra of Raman amplification pumping light (i.e., power of light having a wavelength of $\lambda_{21}$ to $\lambda_{2k}$) in the repeater $30_2$ of the second stage. FIGS. 3C and 5C are spectra of Raman amplification pumping light (i.e., power of light having a wavelength of $\lambda_{M1}$ to $\lambda_{Mk}$) in the repeater $30_M$ of the M-th stage.

Figure 4A:
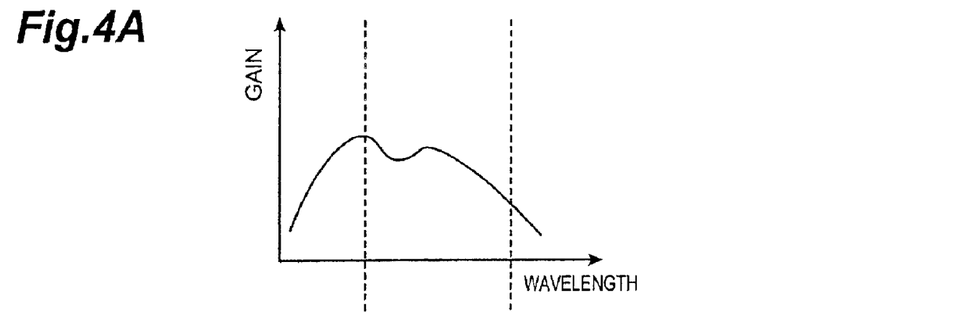
FIGS. 4A to 4D are respective examples of spectra of Raman amplification pumping light in parts of the optical communication system according to the first embodiment.
Figure 4B:
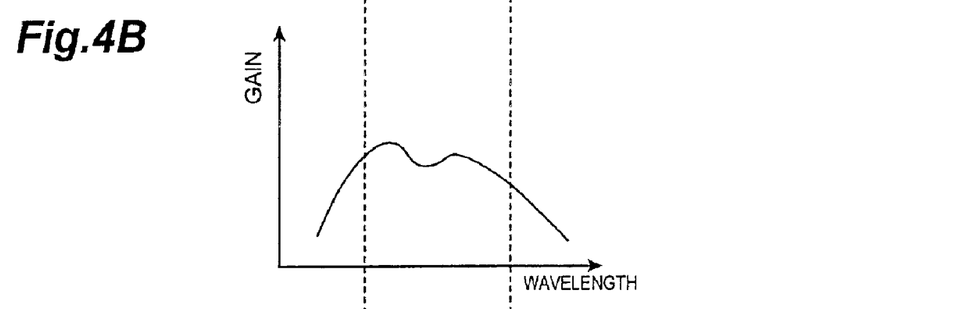
Figure 4C:
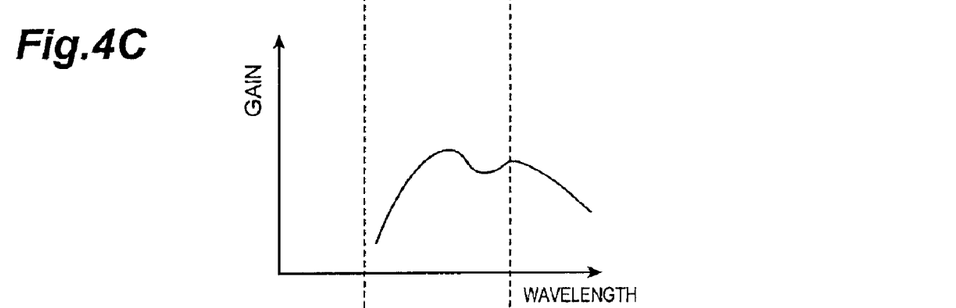
Figure 4D:
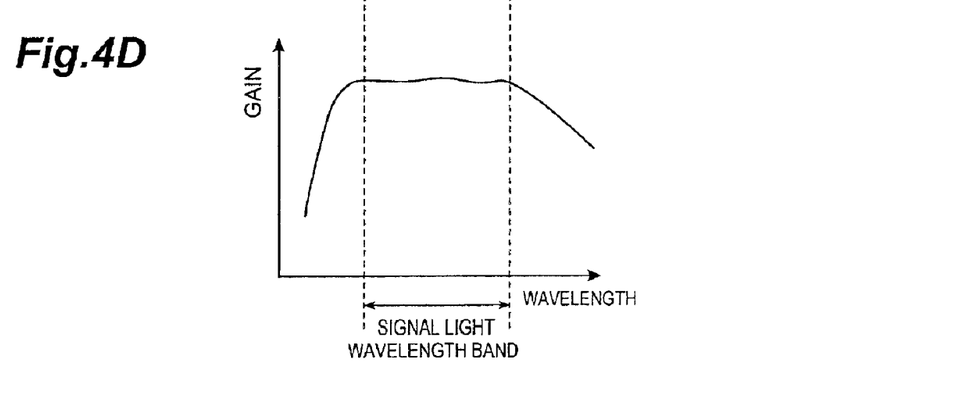
Figure 5A:
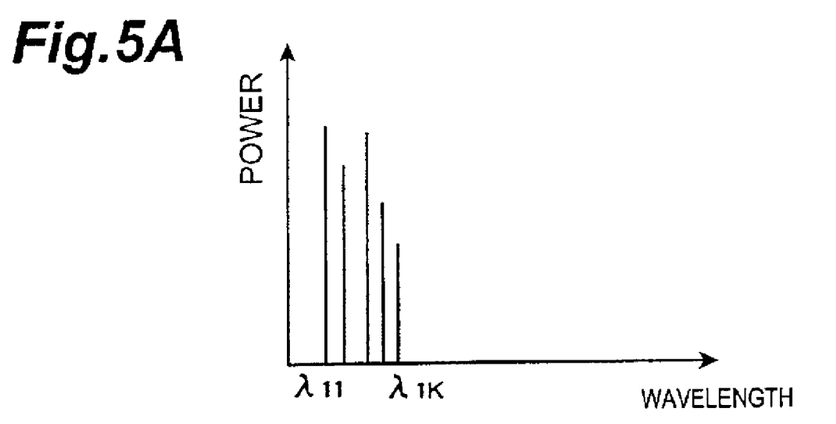
FIGS. 5A to 5C are other respective examples of spectra of Raman amplification pumping light in parts of the optical communication system according to the first embodiment.
Figure 5B:
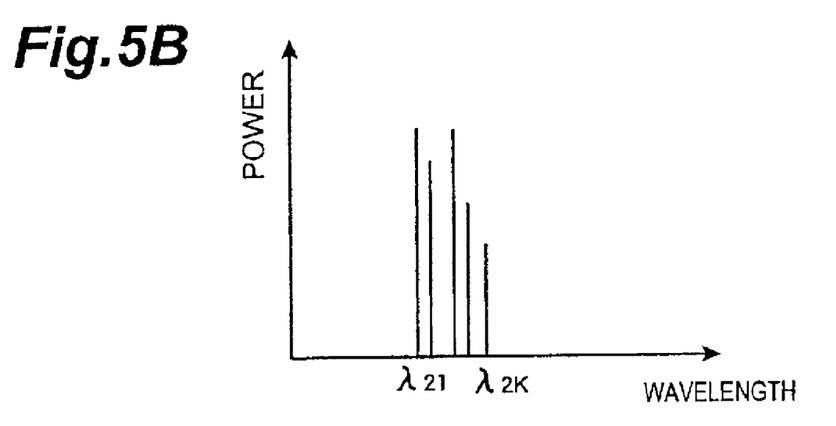
Figure 5C:
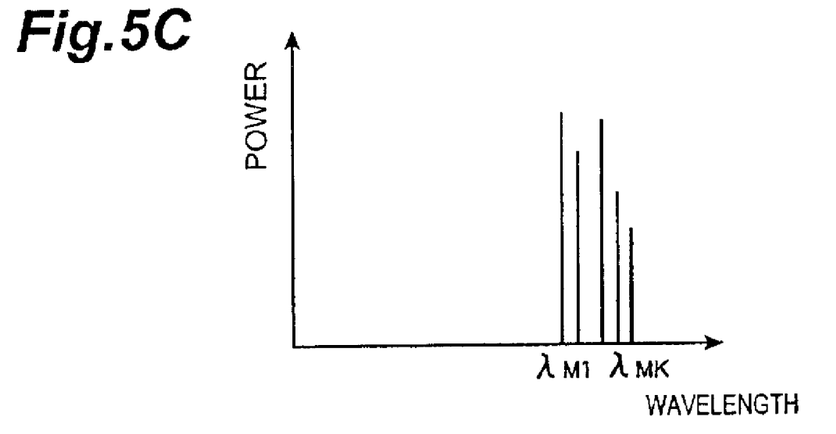
Figure 6A:
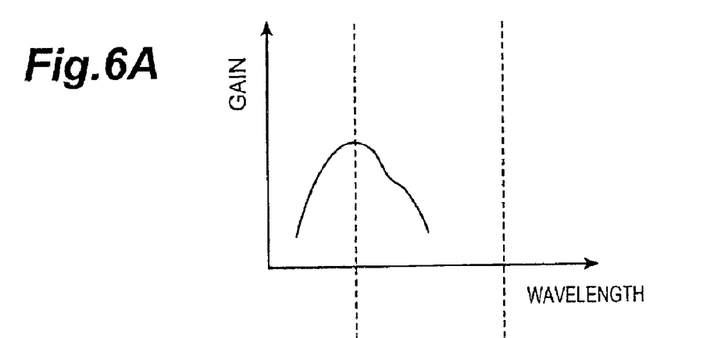
FIGS. 6A to 6D are other respective examples of spectra of Raman amplification pumping light in parts of the optical communication system according to the first embodiment.
Figure 6B:
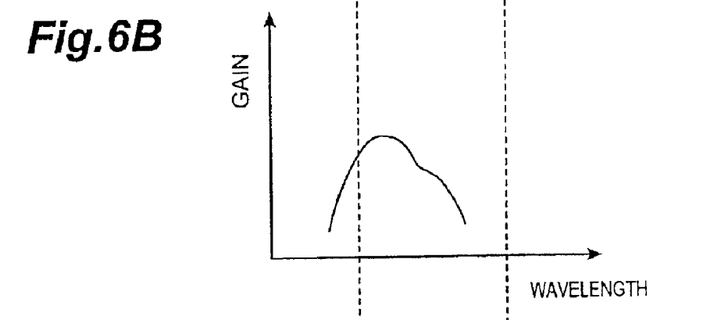
Figure 6C:
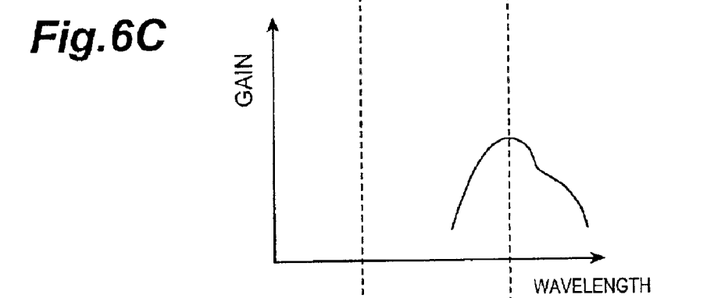
Figure 6D:
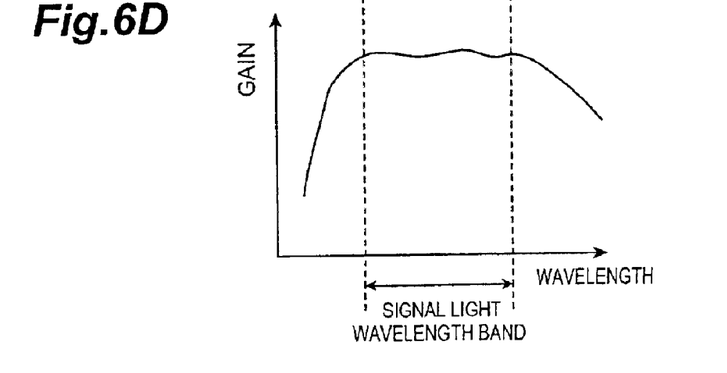

FIGS. 4A and 6A are gain spectra of Raman amplification in the optical fiber $31_1$ in the repeater $30_1$ of the first stage. FIGS. 4B and 6B are gain spectra of Raman amplification in the optical fiber $31_1$ in the repeater $30_2$ of the second stage. FIGS. 4C and 6C are gain spectra of Raman amplification in the optical fiber $31_1$ in the repeater $30_M$ of the M-th stage. FIGS. 4D and 6D are gain spectra of Raman amplification in the whole optical transmission line from the transmitter 10 to the receiver 20.

For example, as a relationship between individual wavelengths $\lambda_{mk}$ as shown in FIGS. 3A to 3C and 5A to 5C, it is assumed that $\lambda_{m+1, k} - \lambda_{mk}$ is substantially constant regardless of the value of parameter k ($1 \leq m < M$, $1 \leq k \leq K$). Also, it is assumed that the power of light having each wavelength $\lambda_{mk}$ is substantially constant regardless of the parameter m ($1 \leq m \leq M$, $1 \leq k \leq K$). Here, as shown in FIGS. 4A to 4C and 6A to 6C, it is not always necessary for the gain spectrum of Raman amplification in the optical fiber $31_1$ in the repeater $30_m$ of the m-th stage to be flat and identical within the signal wavelength band, and the gain spectrum may shift in the wavelength axis direction ($1 \leq m \leq M$).

As shown in FIGS. 3A to 3C, the wavelength band $\lambda_{m1}$ to $\lambda_{mk}$ of Raman amplification pumping light in the repeater $30_m$ of the m-th stage and the wavelength band $\lambda_{m+1, 1}$ to $\lambda_{m+1, k}$ of Raman amplification pumping light in the repeater $30_{m+1}$ of the (m+1)-th stage may overlap each other ($1 \leq m < M$) In this case, as shown in FIGS. 4A to 4C, the repeater of each stage can attain a gain in substantially all the wavelength ranges within the signal wavelength band. Also, as shown in FIGS. 5A to 5C, the wavelength band $\lambda_{m+1, 1}$ to $\lambda_{m+1, k}$ of Raman amplification pumping light in the repeater $30_{m+1}$ of the (m+1)-th stage may shift to the longer wavelength side than the wavelength band $\lambda_{m1}$ to $\lambda_{mk}$ of Raman amplification pumping light in the repeater $30_m$ of the m-th stage ($1 \leq m < M$). In this case, the repeater of each stage can obtain a gain in a part of the wavelength range within the signal wavelength band as shown in FIGS. 6A to 6C.

As shown in FIGS. 4D and 6D, the gain spectrum of Raman amplification in the whole optical transmission line from the transmitter 10 to the receiver 20 is the sum of respective gain spectra of Raman amplification in the repeaters $30_m$ of the individual stages ($1 \leq m \leq M$). Here, the gain spectrum of the whole optical transmission line becomes flat within the signal wavelength band. This flatness of spectrum is achieved, for example, when the deviation in gain of the whole optical transmission line is suppressed to ±1.5 dB or less in a signal wavelength band with a width of 15 nm or greater including a wavelength of 1.55 μm.

For flattening the gain spectrum of the whole optical transmission line within the signal wavelength band, it is necessary that the output center wavelength $\lambda_{mk}$ and output power of each pumping light source $32_k$ in the repeater $30_m$ of each stage be set appropriately ($1 \leq m \leq M$, $1 \leq k \leq K$) Preferably, in this case, the output center wavelength $\lambda_{mk}$ and output power of each pumping light source $32_k$ in the repeater $30_m$ of each stage are appropriately set so as to yield a signal light power at which the occurrence of nonlinear optical phenomena can be suppressed at all the points on the optical transmission line.

When compared with the conventional optical communication system in which the Raman amplifier disclosed in the above-mentioned literature 1 or 2 is included in each repeater, the optical communication system according to the first embodiment including the repeater 30 shown in FIG. 2 exhibits the following effects. Namely, the optical communication system in which the Raman amplifier disclosed in literature 1 is included in each repeater flattens the gain spectrum of Raman amplification in the signal wavelength band by utilizing M×N pumping light sources in total arranged N by N in M stages of repeaters. In the optical communication system according to the first embodiment, by contrast, while the gain spectrum of the whole optical transmission line becomes flat within the signal wavelength band, it is not always necessary for the repeater of M-th stage to have a flat gain, and the respective gains of repeaters are not identical to each other. Therefore, the number K of pumping light sources necessary for each of the repeaters of M stages can be made less than the above-mentioned N in the optical communication system according to the first embodiment, whereby the total number M×N of the pumping light sources required in the whole system can be made smaller than that in the conventional optical communication system in which the Raman amplifier disclosed in literature 1 is included in each repeater. Hence, the manufacturing and operating cost of the optical communication system according to the first embodiment is lowered greatly. Also, since it is not necessary for the optical communication system according to the first embodiment to attenuate the signal light by using a gain equalizer so as to flatten the gain, the pumping efficiency thereof is better than that of the conventional optical communication system shown in literature 2 in which a Raman amplifier is included in each repeater.

Though the first embodiment relates to a case where the wavelength at which the gain of Raman amplification becomes the highest varies among repeaters $30_m$ of the m-th stages, the number of channels at which the gain of Raman amplification is maximum may vary among repeaters $30_m$ of the m-th stages, or the number of pumping light sources may vary among repeaters $30_m$ of the m-th stages. In each case, the gain spectrum of Raman amplification in the whole optical transmission line from the transmitter 10 to the receiver 20 can become flat even when the gain spectrum of Raman amplification in each Raman amplification optical fiber is not flat within the signal wavelength band. The optical communication system according to the first embodiment can make the total number of pumping light sources required in the whole system smaller than that in the conventional optical communication system in which the Raman amplifier disclosed in literature 1 is included in each repeater. Also, since it is not necessary for the optical communication system according to the first embodiment to attenuate the signal light by using a gain equalizer so as to flatten the gain, this system yields a pumping efficiency better than that of the conventional optical communication system in which the Raman amplifier disclosed in literature 2 is included in each repeater.

Figure 7:
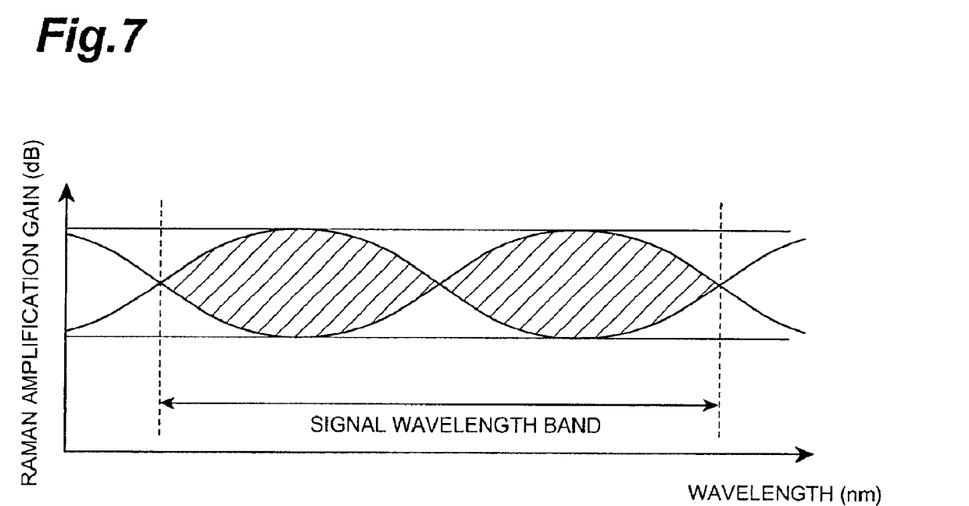
FIG. 7 shows typical respective gain spectra of two Raman amplification optical fibers included in the optical communication system according to the present invention.

Preferably, in the optical communication system according to the first embodiment, the value obtained by integrating the absolute value of difference between respective gain spectra of Raman amplification of two Raman amplification optical fibers selected from the Raman amplification optical fibers included in the optical transmission line with respect to wavelength is at least 7.5 dB·nm, more preferably at least 15.0 dB·nm. FIG. 7 shows respective typical gain spectra of two Raman amplification optical fibers included in the optical communication system according to the first embodiment. In FIG. 7, the area of hatched regions represents the value obtained by integrating the absolute value of difference between respective gain spectra of Raman amplification of the selected two Raman amplification optical fibers with respect to wavelength. This value is preferably at least 7.5 dB·nm (more preferably at least 15.0 dB·nm) in order to reduce the total number of pumping light sources required in the whole system as compared with the conventional optical communication system in which the Raman amplifier disclosed in literature 1 is included in each repeater.

Second Embodiment

Figure 8:
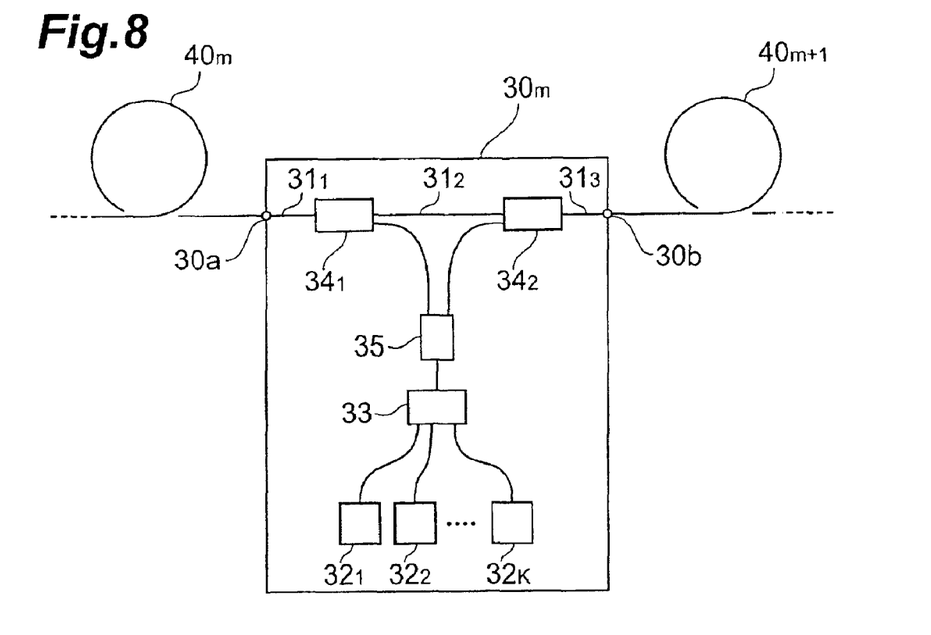
FIG. 8 is a diagram showing the structure of a repeater employed in the optical communication system of FIG. 1 as a second embodiment of the optical communication system according to the present invention.

A second embodiment of the optical communication system according to the present invention will now be explained. FIG. 8 is a diagram showing the structure of a repeater as a second embodiment of the optical communication system according to the present invention. The configuration of the optical communication system according to the third embodiment is similar to that shown in FIG. 1, whereby the repeater $30_m$ of FIG. 8 is employed as the repeaters $30_1$ to $30_M$ in the optical communication system 1 shown in FIG. 1. Also, in the optical communication system according to the second embodiment, optical fibers $40_1$ to $40_{M+1}$ laid in respective repeating sections function as Raman amplification optical fibers.

The repeater $30_m$ shown in FIG. 8 includes optical fibers $31_1$ to $31_3$, K (K≧1) pumping light sources $32_1$ to $32_K$, an optical multiplexer 33, optical couplers $34_1$, $34_2$, and an optical branching device 35. The optical fiber $31_1$, optical coupler $34_1$, optical fiber $31_2$, optical coupler $34_2$, and optical fiber $31_3$ are successively arranged in this order on the signal light path between an input end 30a and an output end 30b. The optical fiber $31_1$ is a short optical fiber for transmitting signal light and Raman amplification pumping light between the input end 30a and the optical coupler $34_1$. Similarly, the optical fiber $31_3$ is a short optical fiber for transmitting signal light and Raman amplification pumping light between the output end 30b and the optical coupler $34_2$.

The pumping light sources $32_1$ to $32_K$ are semiconductor laser light sources, for example, and are different from each other in the center wavelength of output light. The optical multiplexer 33 multiplexes respective light components outputted from the pumping light sources $32_1$ to $32_K$, and outputs thus multiplexed light as Raman amplification pumping light to the optical branching device 35. The optical branching device splits the Raman amplification pumping light (multiplexed light) outputted from the optical multiplexer 33 into two light components, and outputs one of them to the optical coupler $34_1$, and the other to the optical coupler $34_2$. The optical coupler $34_1$ guides one Raman amplification pumping light component outputted from the optical branching device 35 to the optical fiber $40_m$ by way of the optical fiber $31_1$ and input end 30a, and outputs to the optical fiber $31_2$ the signal light fed from the optical fiber $31_1$. On the other hand, the optical coupler $34_2$ guides the other Raman amplification pumping light component outputted from the optical branching device 35 to the optical fiber $40_{m+1}$ by way of the optical fiber $31_3$ and output end 30b, and outputs to the optical fiber $31_3$ the signal light fed from the optical fiber $31_2$.

Namely, in the optical communication system according to the second embodiment provided with thus configured repeaters $30_1$ to $30_M$, the optical fibers $40_1$ to $40_{M+1}$ laid in respective repeating sections function as Raman amplification optical fibers which Raman-amplify signal light when Raman amplification pumping light is supplied thereto. The pumping light sources $32_1$ to $32_K$, optical multiplexer 33, optical couplers $34_1$, $34_2$, and optical branching device 35 within the repeater $30_m$ constitute a pumping light supplier for supplying the Raman amplification pumping light to each of optical fibers $40_m$ and $40_{m+1}$ which are Raman amplification optical fibers (1≦m≦M).

In the optical communication system according to the second embodiment, Raman amplification pumping light is supplied to the optical fiber $40_1$ laid between the transmitter 10 and the repeater $30_1$ of the first stage from the repeater $30_1$. To the optical fiber $40_{M+1}$ laid between the repeater $30_M$ of the M-th stage and the receiver 20, Raman amplification pumping light is supplied from the repeater $30_M$. To the optical fiber $40_m$ laid between the repeaters $30_{m-1}$ and $30_m$, Raman amplification pumping light is supplied from both of the repeaters $30_{m-1}$ and $30_m$ (1<m<M+1). This optical communication system may also comprise a configuration in which Raman amplification pumping light is supplied to the optical fiber $40_1$ from the transmitter 10 as well, and a configuration in which Raman amplification pumping light is supplied to the optical fiber $40_{M+1}$ from the receiver 20 as well.

The signal light sent out from the transmitter 10 successively propagates through the optical fibers $40_1$ to $40_{M+1}$ by way of the repeaters $30_1$ to $30_M$ therebetween, thereby reaching the receiver 20. Since the signal light is Raman-amplified although it incurs loss caused by the transmission loss inherent in the optical fiber $40_m$ while propagating through the optical fiber $40_m$ in each repeating section, its substantial loss is small ($1 \leq m \leq M+1$).

In the optical communication system according to the second embodiment, the spectra of Raman amplification pumping light and gain spectra in respective parts are substantially the same as those in the above-mentioned FIGS. 3A to 3C, 4A to 4D, 5A to 5D, and 6A to 6D. In the second embodiment, it is not necessary for the gain spectrum of Raman amplification in the optical fiber $40_m$ laid in each repeating section to be flat and identical within the signal wavelength band as shown in FIGS. 4A to 4C or FIGS. 6A to 6C, and the gain spectrum may shift in the wavelength axis direction ($1 \leq m \leq M+1$).

As shown in FIG. 4D or 6D, the gain spectrum of Raman amplification in the whole optical transmission line from the transmitter 10 to the receiver 20 is the sum of respective gain spectra of Raman amplification in the optical fibers $40_m$ ($1 \leq m \leq M+1$) laid in the respective repeating sections in the second embodiment as well. Here, the gain spectrum of the whole optical transmission line becomes flat within the signal wavelength band. This flatness of spectrum is achieved, for example, when the deviation in gain of the whole optical transmission line is suppressed to ±1.5 dB or less in a signal wavelength band with a width of 15 nm or greater including a wavelength of 1.55 µm.

For flattening the gain spectrum of the whole optical transmission line within the signal wavelength band, it is necessary that the output center wavelength $\lambda_{mk}$ and output power of each pumping light source $32_k$ in the repeater $30_m$ of each stage be set appropriately ($1 \leq m \leq M$, $1 \leq k \leq K$). Preferably, in this case, the output center wavelength $\lambda_{mk}$ and output power of each pumping light source $32_k$ in the repeater $30_m$ of each stage are appropriately set so as to yield a signal light power at which the occurrence of nonlinear optical phenomena can be suppressed at all the points on the optical transmission line.

The optical communication system according to the second embodiment exhibits effects substantially the same as those of the optical communication system according to the first embodiment. Namely, while the gain spectrum of the whole optical transmission line is flat within the signal wavelength band in the optical communication system according to the second embodiment, it is not always necessary for the gain spectrum in the optical fiber laid in each repeating section to be flat within the signal wavelength band, and the respective gain spectra of optical fibers are not identical to each other. In the optical communication system according to the second embodiment, the number K of pumping light sources necessary for each of the repeaters of M stages can be made smaller than the conventional number of N, whereby the total number M×N of pumping light sources required in the whole system can be made smaller than that in the conventional optical communication system in which the Raman amplifier disclosed in literature 1 is included in each repeater. As a consequence, the optical communication system according to the second embodiment can lower the manufacturing and operating cost. Also, since the optical communication system according to the second embodiment does not have a configuration in which the signal light is attenuated by a gain equalizer so as to flatten the gain, it yields a pumping efficiency better than that in the conventional optical communication system in which the Raman amplifier disclosed in literature 2 is included in each repeater. Further, when compared with the optical communication system according to the first embodiment in which a Raman amplification optical fiber is included within each repeater, the optical communication system according to the second embodiment has a shorter transmission path length of signal light from the transmitter 10 to the receiver 20 and a smaller inherent transmission loss since the signal light is Raman-amplified in the optical fiber laid in each repeating section.

Though the second embodiment also relates to a case where the wavelength at which the gain of Raman amplification becomes the highest varies among optical fibers $40_m$ laid in the respective repeating sections, the number of channels at which the gain of Raman amplification is maximum may vary among the optical fibers $40_m$, and the number of pumping light sources may vary among repeaters $30_m$ of the m-th stages. In each case, the gain spectrum of Raman amplification in the whole optical transmission line from the transmitter 10 to the receiver 20 can become flat even when the gain spectrum of Raman amplification in each Raman amplification optical fiber (corresponding to the optical fiber $40_m$ laid in each repeating section) is not flat within the signal wavelength band. The optical communication system according to the second embodiment can make the total number of pumping light sources required in the whole system smaller than that in the conventional optical communication system in which the Raman amplifier disclosed in literature 1 is included in each repeater. Also, since it is not necessary for the optical communication system according to the second embodiment to attenuate the signal light by using a gain equalizer so as to flatten the gain, this system yields a pumping efficiency better than that of the conventional optical communication system in which the Raman amplifier disclosed in literature 2 is included in each repeater.

Preferably, in the optical communication system according to the second embodiment, the value obtained by integrating the absolute value of difference between respective gain spectra of Raman amplification of two Raman amplification optical fibers selected from the Raman amplification optical fibers included in the optical transmission line with respect to wavelength is at least 7.5 dB·nm, more preferably at least 15.0 dB·nm. This value is preferably at least 7.5 dB·nm (more preferably at least 15.0 dB·nm) in order to make the total number of pumping light sources required in the whole system smaller than that in the conventional optical communication system in which the Raman amplifier disclosed in literature 1 is included in each repeater.

Third Embodiment

Figure 9:
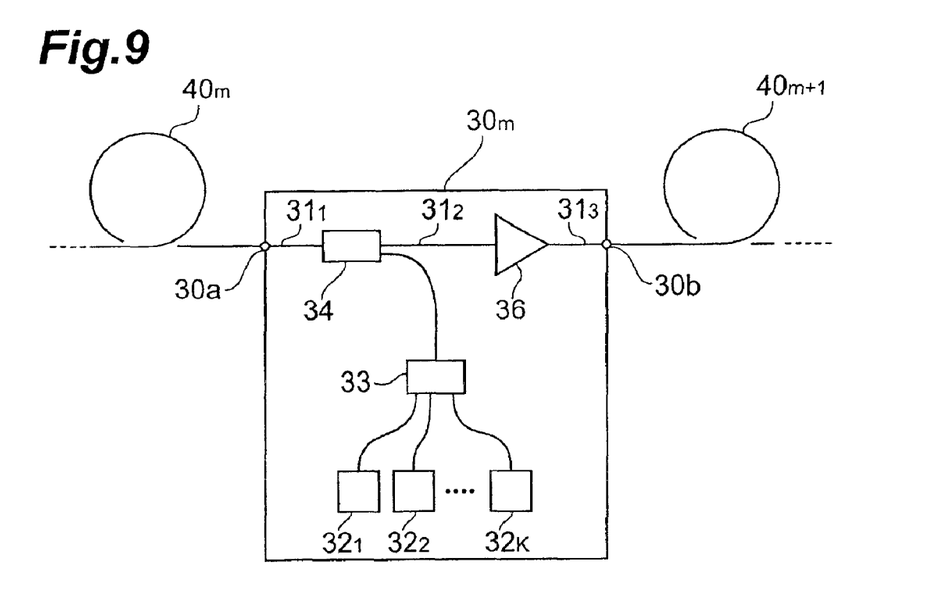
FIG. 9 is a diagram showing the structure of a repeater employed in the optical communication system of FIG. 1 as a third embodiment of the optical communication system according to the present invention.

A third embodiment of the optical communication system according to the present invention will now be explained. FIG. 9 is a diagram showing the structure of a repeater as a third embodiment of the optical communication system according to the present invention. The configuration of the optical communication system according to the third embodiment is similar to that shown in FIG. 1, whereby the repeater $30_m$ of FIG. 9 is employed as the repeaters $30_1$ to $30_M$ in the optical communication system 1 shown in FIG. 1. Also, in the optical communication system according to the third embodiment, optical fibers $40_1$ to $40_M$ laid in respective repeating sections function as Raman amplification optical fibers.

The repeater $30_I$ shown in FIG. 9 includes optical fibers $31_1$ to $31_3$, K (K≧1) pumping light sources $32_1$ to $32_K$, an optical multiplexer 33, an optical coupler 34, and an Er-doped optical fiber amplifier 36. The optical fiber $31_1$, optical coupler 34, optical fiber $31_2$, Er-doped optical fiber amplifier 36, and optical fiber $31_3$ are successively arranged in this order on the signal light path between an input end 30a and an output end 30b. The optical fiber $31_1$ is a short optical fiber for transmitting signal light and Raman amplification pumping light between the input end 30a and the optical coupler 34.

The pumping light sources $32_1$ to $32_K$ are semiconductor laser light sources, for example, and are different from each other in the center wavelength of output light. The optical multiplexer 33 multiplexes respective light components outputted from the pumping light sources $32_1$ to $32_K$, and outputs thus multiplexed light as Raman amplification pumping light to the optical coupler 34. The optical coupler 34 guides the Raman amplification pumping light outputted from the optical multiplexer 33 to the optical fiber $40_m$ by way of the optical fiber $31_1$ and input end 30a, and outputs to the optical fiber $31_2$ the signal light fed from the optical fiber $31_1$. The Er-doped optical fiber amplifier 36, on the other hand, is an optical device employing, as an optical amplification medium, an optical fiber whose optical waveguide region is doped with Er element, and amplifying signal light (in the wavelength band of 1.55 μm or 1.58 μm) when pumping light (having a wavelength of 0.98 μm or 1.48 μm) is supplied to the Er-doped optical fiber. The Er-doped optical fiber amplifier 36 optically amplifies the signal light fed from the optical fiber $31_2$, and outputs thus amplified signal light to the optical fiber $31_3$.

Namely, in the optical communication system according to the third embodiment provided with thus configured repeaters $30_1$ to $30_M$, the optical fibers $40_1$ to $40_M$ laid in respective repeating sections function as Raman amplification optical fibers which Raman-amplify signal light when Raman amplification pumping light is supplied thereto. The pumping light sources $32_1$ to $32_K$, optical multiplexer 33, and optical coupler 34 within the repeater $30_m$ constitute a pumping light supplier for supplying Raman amplification pumping light to the optical fiber $40_m$ acting as a Raman amplification optical fiber (1≦m≦M).

In the optical communication system according to the third embodiment, Raman amplification pumping light is supplied to the optical fiber $40_1$ laid between the transmitter 10 and the repeater $30_1$ of the first stage from the repeater $30_1$. To the optical fiber $40_m$ laid between the repeaters $30_{m-1}$ and $30_m$, Raman amplification pumping light is supplied from the repeater $30_m$ (1<m≦M). The optical communication system according to the third embodiment may comprise a structure in which Raman amplification pumping light is supplied to the optical fiber $40_{M+1}$ laid between the repeater $30_M$ of the M-th stage and the receiver 20 from the receiver 20.

The signal light sent out from the transmitter 10 successively propagates through the optical fibers $40_1$ to $40_{M+1}$ by way of the repeaters $30_1$ to $30_M$ therebetween, thereby reaching the receiver 20. Since the signal light is Raman-amplified although it incurs loss caused by the transmission loss inherent in the optical fiber $40_m$ while propagating through the optical fiber $40_m$ in each repeating section, its substantial loss is small, whereby a desirable gain is obtained (1≦m≦M).

In the optical communication system according to the third embodiment, the spectra of Raman amplification pumping light and gain spectra are substantially the same as those in the above-mentioned FIGS. 3A to 3C, 4A to 4D, 5A to 5D, and 6A to 6D. In the optical communication system according to the third embodiment, it is not necessary for the gain spectrum of Raman amplification in the optical fiber $40_m$ laid in each repeating section to be flat and identical within the signal wavelength band as shown in FIGS. 4A to 4C or FIGS. 6A to 6C, and the gain spectrum may shift in the wavelength axis direction (1≦m≦M).

As shown in FIG. 4D or 6D, the gain spectrum of Raman amplification in the whole optical transmission line from the transmitter 10 to the receiver 20 is the sum of gain spectra of Raman amplification in the optical fibers $40_m$ (1≦m≦M) laid in the respective repeating sections in the third embodiment as well. Here, the gain spectrum of the whole optical transmission line becomes flat within the signal wavelength band. This flatness of spectrum is achieved, for example, when the deviation in gain of the whole optical transmission line is suppressed to ±1.5 dB or less in a signal wavelength band with a width of 15 nm or greater including a wavelength of 1.55 μm.

For flattening the gain spectrum of the whole optical transmission line within the signal wavelength band, it is necessary that the output center wavelength $\lambda_{mk}$ and output power of each pumping light source $32_k$ in the repeater $30_m$ of each stage be set appropriately (1≦m≦M, 1≦k≦K) Preferably, in this case, the output center wavelength $\lambda_{mk}$ and output power of each pumping light source $32_k$ in the repeater $30_m$ of each stage are appropriately set so as to yield a signal light power at which the occurrence of nonlinear optical phenomena can be suppressed at all the points on the optical transmission line.

The optical communication system according to the third embodiment exhibits not only effects which are substantially the same as those of the optical communication system according to the second embodiment, but also the following effects. Namely, since the optical communication system according to the third embodiment comprises an Er-doped optical fiber amplifier in addition to the Raman amplifier within each repeater, signal light in the 1.45-μm wavelength band can be amplified by the Raman amplifier while signal light in the 1.55-μm wavelength band and 1.58-μm wavelength band is Raman-amplified by the Raman amplifier, for example, whereby optical communications in a wider signal wavelength band are possible.

SPECIFIC EXAMPLE

A specific example of the optical communication system according to the present invention will now be explained together with a comparative example. The specific example of optical communication system was configured such that an optical transmission line in which two single-mode optical fibers each having a length of 50 km were fusion-spliced to each other was laid, whereas each of the optical fibers A and B was pumped in a bidirectional fashion.

In the comparative example, on the other hand, the Raman amplification pumping light supplied to each of the optical fibers A and B was multiplexed light including respective laser light beams outputted from seven semiconductor laser light sources. In the comparative example, the first laser light source outputted laser light having a wavelength of 1420 nm (with a power of 21.00 dBm), the second laser light source outputted laser light having a wavelength of 1425 nm (with a power of 19.38 dBm), the third laser light source outputted laser light having a wavelength of 1430 nm (with a power of 19.40 dBm), the fourth laser light source outputted laser light having a wavelength of 1435 nm (with a power of 18.55 dBm), the fifth laser light source outputted laser light having a wavelength of 1440 nm (with a power of 13.99 dBm), the sixth laser light source outputted laser light having a wavelength of 1450 nm (with a power of 20.21 dBm), and the seventh laser light source outputted laser light having a wavelength of 1460 nm (with a power of 23.34 dBm). In this comparative example, 14 semiconductor laser light sources were utilized in the whole system.

In the specific example of the optical communication system according to the present invention, the Raman amplification pumping light supplied to the optical fiber A was multiplexed light including respective laser light beams outputted from four semiconductor laser light sources. In the four semiconductor laser light sources, the first semiconductor laser light source outputted laser light having a wavelength of 1420 nm (with a power of 22.7598 dBm), the second semiconductor laser light source outputted laser light having a wavelength of 1430 nm (with a power of 22.8138 dBm), the third semiconductor laser light source outputted laser light having a wavelength of 1440 nm (with a power of 18.7548 dBm), and the fourth semiconductor laser light source outputted laser light having a wavelength of 1460 nm (with a power of 24.5866 dBm) . On the other hand, the Raman amplification pumping light supplied to the optical fiber B was multiplexed light including respective laser light beams outputted from five semiconductor laser light sources. In the five semiconductor laser light sources, the first semiconductor laser light source outputted laser light having a wavelength of 1420 nm (with a power of 16.9601 dBm), the second semiconductor laser light source outputted laser light having a wavelength of 1425 nm (with a power of 21.6249 dBm), the third semiconductor laser light source outputted laser light having a wavelength of 1435 nm (with a power of 21.5071 dBm), the fourth semiconductor laser light source outputted laser light having a wavelength of 1450 nm (with a power of 18.4999 dBm), and the fifth semiconductor laser light source outputted laser light having a wavelength of 1460 nm (with a power of 23.1174 dBm). In this specific example, nine semiconductor laser light sources were utilized in the whole system.

Figure 10:
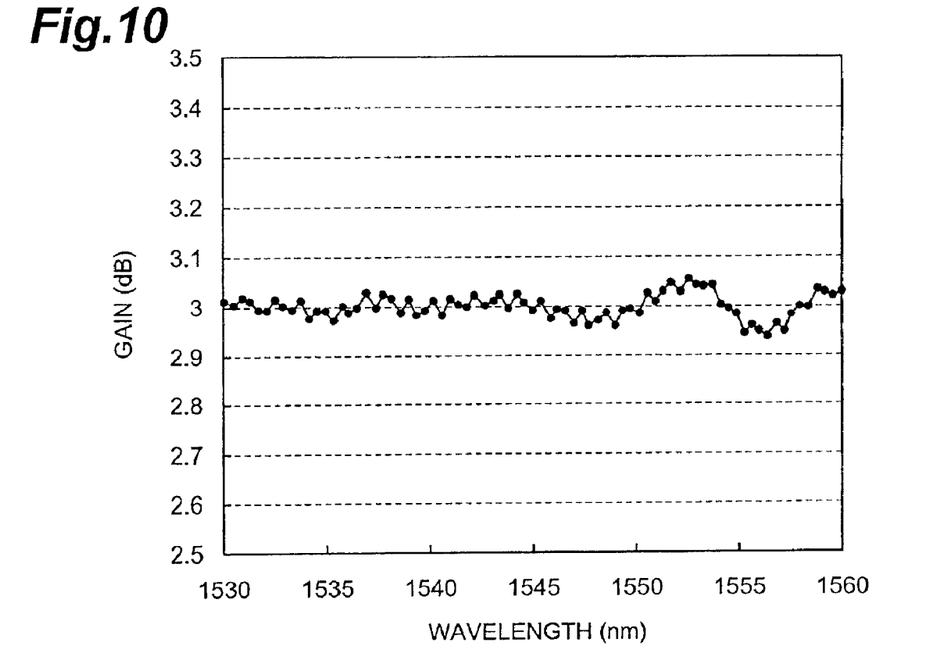
FIG. 10 shows a gain spectrum of Raman amplification in an optical transmission line including an optical fiber A as a comparative example.
Figure 11:
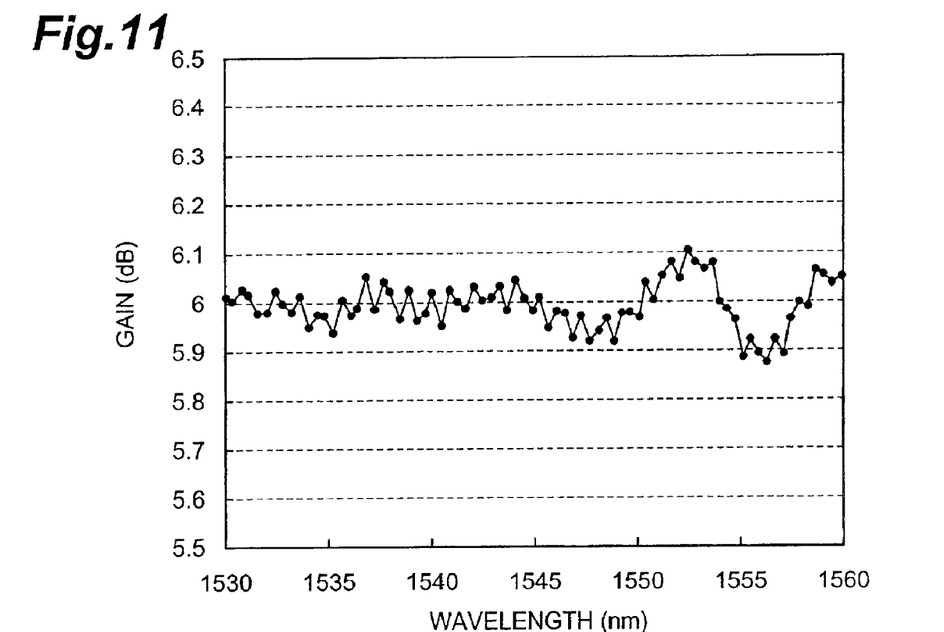
FIG. 11 shows a gain spectrum of Raman amplification in an optical transmission line including optical fibers A and B as the comparative example.
Figure 12:
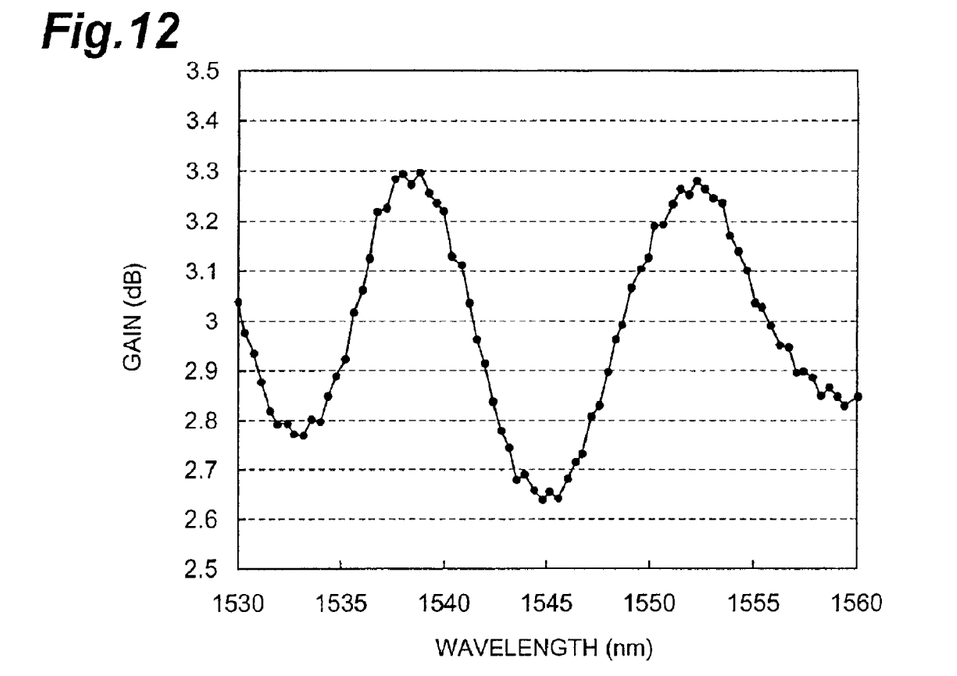
FIG. 12 shows a gain spectrum of Raman amplification in an optical transmission line including the optical fiber A as a specific example of the optical communication system according to the present invention.
Figure 13:
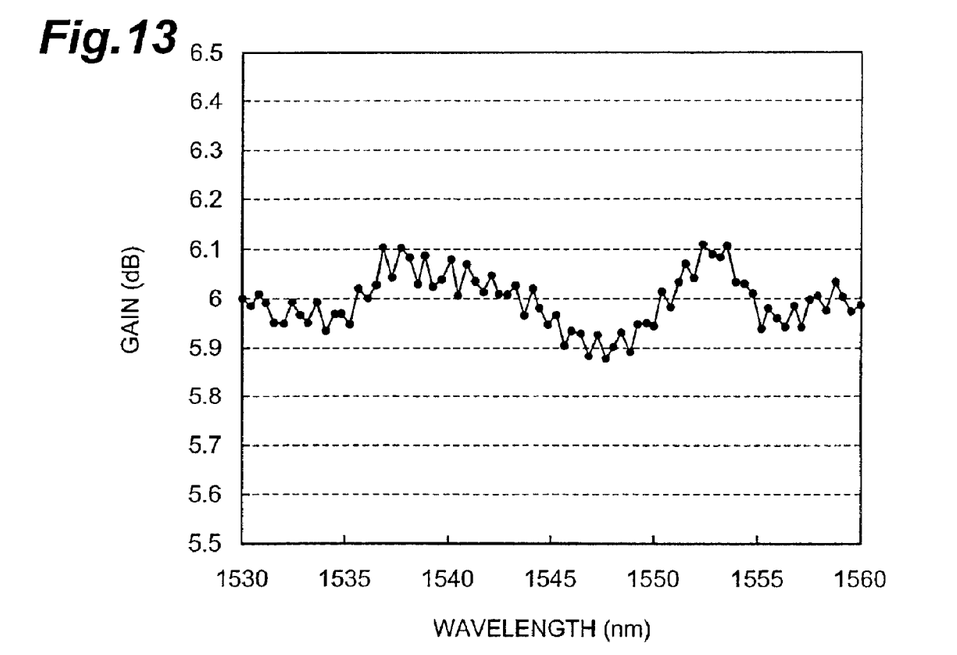
FIG. 13 shows a gain spectrum of Raman amplification in an optical transmission line including the optical fibers A and B as the specific example of the optical communication system according to the present invention.

FIG. 10 shows the gain spectrum of Raman amplification of the optical transmission line including the optical fiber A as the comparative example, whereas FIG. 11 shows the gain spectrum of Raman amplification of the whole optical transmission line including the optical fibers A and B as the comparative example. FIG. 12 shows the gain spectrum of Raman amplification of the optical transmission line including the optical fiber A as the specific example of the optical communication system according to the present invention, whereas FIG. 13 shows the gain spectrum of Raman amplification of the optical transmission line including the optical fibers A and B as the specific example of the optical communication system according to the present invention. The gain spectrum of Raman amplification in the optical fiber A was flat in the comparative example in which Raman amplification pumping light was supplied from seven semiconductor laser light sources (FIG. 10), but not flat in the specific example in which Raman pumping light was supplied from four semiconductor laser light sources (FIG. 12). As for the gain spectrum of Raman amplification in the whole optical transmission line constituted by the optical fibers A and B, a flatness on the same order (with a deviation of about ±0.1 dB) was realized in both of the comparative example in which 14 semiconductor laser light sources were utilized in the whole system (FIG. 11) and the specific example in which 9 semiconductor laser light sources were utilized in the whole system (FIG. 12). Thus, the specific example makes the number of pumping light sources smaller than that in the comparative example while securing a flatness of gain spectrum on a par with that in the comparative example.

Modified Examples

The optical communication system according to the present invention can be modified in various manners without being restricted to the embodiments mentioned above. For example, the repeater in the first embodiment (FIG. 2) may comprise an Er-doped optical fiber amplifier disposed between the optical coupler 34 and the output end 30b. In this case, optical communications over a wider signal wavelength band are possible as in the optical communication system of the third embodiment.

In each of the first to third embodiments, the spectrum of Raman amplification pumping light (constituted by the output center wavelength and output power of each pumping light source) is adjusted in order to regulate the gain spectrum in each Raman amplification optical fiber. However, the gain spectrum in each Raman amplification optical fiber may be regulated by adjusting the length or characteristics of each Raman amplification optical fiber.

According to the present invention, as explained in the foregoing, two Raman amplification optical fibers selected from a plurality of Raman amplification optical fibers included in an optical transmission line laid between a first point (transmitter or repeater) and a second point (receiver or repeater) are designed so as to differ from each other in at least one of the wavelength at which the gain of Raman amplification becomes the highest and the number of signal channels at which the gain of Raman amplification is maximum. Also, the number of pumping light sources included in the respective pumping light suppliers for supplying Raman pumping light to the selected two Raman amplification optical fibers may differ from each other.

Thus, the present invention makes it possible to flatten the gain spectrum of Raman amplification in the whole optical transmission line from the first point to the second point within the signal wavelength band even when the gain spectrum of Raman amplification in each Raman amplification optical fiber is not flat. Also, the present invention can make the total number of pumping light sources necessary for the whole system smaller than that in the conventional optical communication system in which the Raman amplifier disclosed in literature 1 is included in each repeater, thereby lowering the manufacturing and operating cost of the whole system. Further, since the present invention does not have a structure in which the signal light is attenuated by a gain equalizer so as to flatten the gain, it can yield a pumping efficiency better than that of the conventional communication system in which the Raman amplifier disclosed in literature 2 is included in each repeater.

What is claimed is:

1. An optical communication system for transmitting signal light including a plurality of signal channels within a signal wavelength band from a first point to a second point, said optical communication system comprising:

an optical transmission line, including a plurality of Raman amplification optical fibers, for transmitting said signal light from said first point to said second point, each of said Raman amplification optical fibers Raman-amplifying said signal light when Raman amplification pumping light is supplied thereto; and respective pumping light suppliers prepared so as to correspond to said plurality of Raman amplification optical fibers, each of said pumping light suppliers supplying Raman amplification pumping light to said Raman amplification optical fiber corresponding thereto;

wherein two Raman amplification optical fibers selected from said plurality of Raman amplification optical fibers differ from each other in at least one of the wavelength at which a gain of Raman amplification becomes the highest, and the number of channels at which said gain of Raman amplification is maximum, and wherein a value obtained by integrating the absolute value of difference between respective gain spectra of Raman amplification of said selected two Raman amplification optical fibers with respect to wavelength is at least 7.5 dB·nm.

2. An optical communication system according to claim 1, wherein respective pumping light suppliers corresponding to said selected two Raman amplification optical fibers differ from each other in the number of pumping light sources included therein.

* * * * *